(12) United States Patent
Al-Zubaidy et al.

(10) Patent No.: US 11,529,781 B2
(45) Date of Patent: Dec. 20, 2022

(54) THERMOPLASTIC COMPOSITE

(71) Applicant: GE Oil & Gas UK Limited, Bristol (GB)

(72) Inventors: Majeed Al-Zubaidy, Newcastle upon Tyne (GB); Neville Dodds, Newcastle upon Tyne (GB); Vineet Jha, Newcastle upon Tyne (GB); James Latto, Newcastle upon Tyne (GB); David Finch, Newcastle upon Tyne (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 697 days.

(21) Appl. No.: 16/338,236

(22) PCT Filed: Sep. 28, 2017

(86) PCT No.: PCT/GB2017/052918
§ 371 (c)(1),
(2) Date: Mar. 29, 2019

(87) PCT Pub. No.: WO2018/060718
PCT Pub. Date: Apr. 5, 2018

(65) Prior Publication Data
US 2020/0031071 A1 Jan. 30, 2020

(30) Foreign Application Priority Data
Sep. 30, 2016 (GB) ...................................... 1616706

(51) Int. Cl.
*B32B 1/08* (2006.01)
*B29D 23/00* (2006.01)
(Continued)

(52) U.S. Cl.
CPC ............ *B29D 23/001* (2013.01); *B29C 53/60* (2013.01); *B32B 1/08* (2013.01); *B32B 5/08* (2013.01);
(Continued)

(58) Field of Classification Search
CPC ..... D01F 6/32; D01F 6/00; D01F 6/12; B32B 1/08
(Continued)

(56) References Cited

U.S. PATENT DOCUMENTS 4,469,138 A * 9/1984 Satoh ........................ C08K 7/06
524/495
4,975,321 A * 12/1990 Gentile ...................... C08J 5/04
428/421
(Continued)

FOREIGN PATENT DOCUMENTS

CN 104797409 A 7/2015
CN 105142883 A 12/2015
(Continued)

OTHER PUBLICATIONS

Second Office Action issued for Chinese Patent Application No. 2017800608521 dated Jun. 8, 2021 (English Translation), 9 pages.
(Continued)

*Primary Examiner* — Patrick F Brinson
(74) *Attorney, Agent, or Firm* — Troutman Pepper Hamilton Sanders LLP

(57) ABSTRACT

A method of making a flexible pipe layer, which method comprises: commingling polymer filaments and carbon fibre filaments to form an intimate mixture, forming yarns of the commingled filaments, forming the yarns into a tape, and applying the tape to a pipe body to form a flexible pipe layer.

20 Claims, 2 Drawing Sheets

Figure 1:
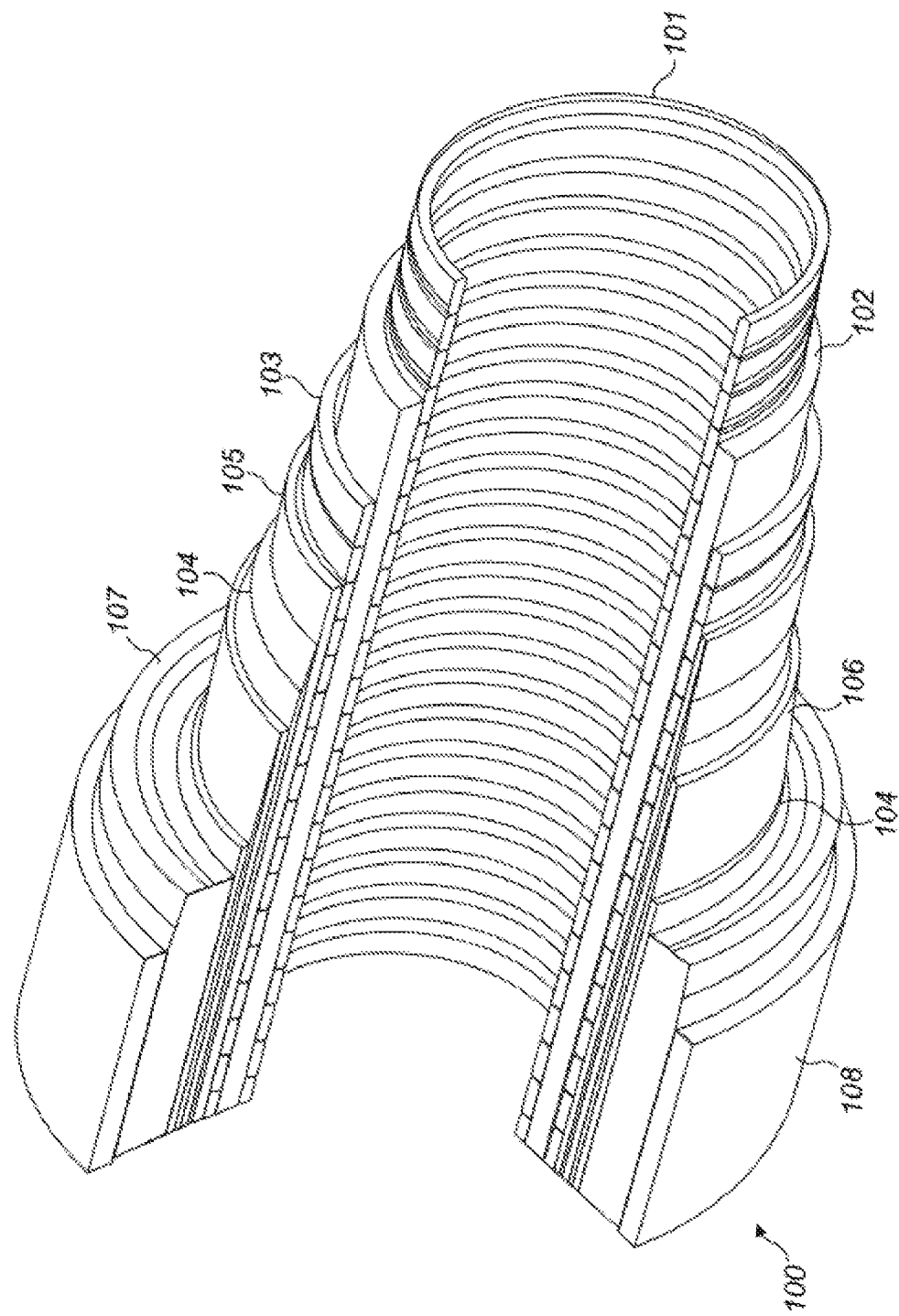

(51) Int. Cl.
*B29C 53/60* (2006.01)
*B32B 5/08* (2006.01)
*B32B 27/08* (2006.01)
*B32B 27/12* (2006.01)
*B32B 27/30* (2006.01)
*C08J 5/04* (2006.01)
*C08K 7/06* (2006.01)
*D02G 3/16* (2006.01)
*D02G 3/40* (2006.01)
*D02G 3/44* (2006.01)

(52) U.S. Cl.
CPC .............. *B32B 27/08* (2013.01); *B32B 27/12* (2013.01); *B32B 27/304* (2013.01); *C08J 5/042* (2013.01); *C08K 7/06* (2013.01); *D02G 3/16* (2013.01); *D02G 3/402* (2013.01); *D02G 3/447* (2013.01); *B32B 2262/0238* (2013.01); *B32B 2262/106* (2013.01); *B32B 2307/30* (2013.01); *B32B 2597/00* (2013.01); *C08J 2327/16* (2013.01); *D10B 2321/042* (2013.01); *D10B 2331/02* (2013.01); *D10B 2331/061* (2013.01)

(58) Field of Classification Search
USPC ........ 138/134, 135, 177, 174; 428/364, 394, 428/357, 362, 422
See application file for complete search history.

(56) References Cited

U.S. PATENT DOCUMENTS

| | | | | |
|---|---|---|---|---|
| 5,069,959 | A * | 12/1991 | Gentile | C08J 5/04 428/421 |
| 6,132,866 | A | 10/2000 | Nelson et al. | |
| 6,416,896 | B1 | 7/2002 | Tamaru et al. | |
| 8,057,887 | B2 * | 11/2011 | Morin | D03D 15/573 428/221 |
| 2002/0079610 | A1 * | 6/2002 | Uy | D01F 6/32 425/464 |
| 2003/0175513 | A1 * | 9/2003 | Tokarsky | D02G 3/38 428/375 |
| 2004/0194444 | A1 * | 10/2004 | Vinod | D02G 3/46 57/243 |
| 2010/0192758 | A1 * | 8/2010 | Clough | D07B 1/025 87/8 |
| 2014/0309355 | A1 | 10/2014 | Hayakawa et al. | |
| 2014/0326357 | A1 | 11/2014 | Graham | |
| 2015/0011697 | A1 | 1/2015 | Brown et al. | |
| 2015/0030295 | A1 | 1/2015 | Do | |
| 2016/0069484 | A1 | 3/2016 | Jha et al. | |

FOREIGN PATENT DOCUMENTS

| | | |
|---|---|---|
| CN | 105339397 A | 2/2016 |
| JP | 2005220486 A | 8/2005 |
| JP | 2007031844 A | 2/2007 |
| WO | 2014078680 A1 | 5/2014 |
| WO | 2015118356 A1 | 8/2015 |
| WO | 2015124924 A1 | 8/2015 |

OTHER PUBLICATIONS

Kalman, M.D., et al, "Flexible Risers with Composite Armor for Deep Water Oil and Gas Production," Reifsnider & Cardon (eds), Dec. 31, 1998, pp. 41-44, Balkema, Rotterdam, Netherlands.
First Office Action issued for Chinese Patent Application No. 2017800608521 dated Oct. 20, 2020, with English translation. 20 pages.
European Search Report dated Jan. 2, 2022 from corresponding European Patent Application No. 21202990.4.
International Partial International Search Report dated Dec. 12, 2017 from corresponding PCT/GB2017/052918, pp. 17.
International Search Report and Written Opinion dated Mar. 29, 2018 from corresponding PCT/GB2017/052918, pp. 21.
Charlesworth, et al., "Materials Selection for Thermoplastic Fibre Reinforced Risers", Deep Offshore Technology International Conference held in Aberdeen, Scotland, Oct. 14-16, 2014.
Kalman, M. D. et al: "Flexible risers with composite armor for deep water oil and gas production", Progress in Durability Analysis of Composite Systems, Proceedings of the International Conference on Progress in Durability Analysis of Composite Systems, 3rf, Blacksburg, VA., Sep. 14-17, 1997, Meeting Date 1997, 41-48. 1998.
UK Intellectual Property Office Search Report dated Feb. 27, 2017 from related Great Britain Application No. GB1616706.6.

* cited by examiner

THERMOPLASTIC COMPOSITE

CROSS-REFERENCE TO RELATED APPLICATIONS

This Application is a U.S. National Application of PCT/GB2017/052918, filed Sep. 28, 2017, and claims priority to Provisional Patent Application GB 1616706.6, filed Sep. 30, 2016, the disclosures of which are incorporated herein by reference in their entirety.

The present invention relates to a thermoplastic composite and a method for forming such a composite. In particular, but not exclusively, the present invention relates to a flexible pipe formed from the thermoplastic composite. The present invention also relates to a method of making a flexible pipe layer.

Traditionally flexible pipe is utilised to transport production fluids, such as oil and/or gas and/or water, from one location to another. Flexible pipe is particularly useful for connecting a sub-sea location (which may be deep underwater) to a sea level location. Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including metallic and polymer layers.

Unbonded flexible pipe has been used for deep water (less than 3,300 feet (1,005.84 metres)) and ultra-deep water (greater than 3,300 feet) developments. It is the increasing demand for oil which is causing exploration to occur at greater and greater depths where environmental factors are more extreme. For example in such deep and ultra-deep water environments ocean floor temperature increases the risk of conveyed fluids cooling to a temperature that may lead to pipe blockage. Increased depths also increase the pressure associated with the environment in which the flexible pipe must operate.

In many known flexible pipe designs the pipe body includes one or more pressure armour layers. The primary load on such layers is formed from radial forces. Pressure armour layers often have a specific cross sectional profile to interlock so as to be able to maintain and absorb radial forces resulting from outer or inner pressure on the pipe. Cross sectional profiles of the wound wires that prevent the pipe from collapsing or bursting as a result of pressure are sometimes called pressure-resistant profiles. When pressure armour layers are formed from helically wound wires forming hoop components, the radial forces from outer or inner pressure on the pipe cause the hoop components to expand or contract, putting a tensile load on the wires.

One way to improve the load response and thus performance of armour layers is to manufacture the layers from thicker and stronger and thus more robust materials. For example for pressure armour layers in which the layers are often formed from wound wires with adjacent windings in the layer interlocking, manufacturing the wires from thicker material results in the strength increasing appropriately. However, as more material is used, the weight of the flexible pipe increases. Ultimately the weight of the flexible pipe can become a limiting factor in using flexible pipe. Additionally manufacturing flexible pipe using thicker and thicker material increases material costs appreciably, which may also be a disadvantage.

The present inventors have developed a material that can be used to form an armour layer around the pipe. Unlike conventional armour layers that are typically formed of wound, inter-locking metal wires, the new material is based on a thermoplastic composite.

According to a first aspect of the present invention there is provided a method of making a flexible pipe layer, which method comprises commingling polymer filaments and carbon fibre filaments to form an intimate mixture, forming yarns of the commingled filaments, forming the yarns into a tape, and applying the tape to a pipe body to form a flexible pipe layer.

According to a further aspect of the present invention there is provided a thermoplastic composite comprising fluoropolymer filaments and carbon fibre filaments, wherein the fluoropolymer filaments and carbon fibre filaments are commingled to form an intimate mixture, and wherein the fluoropolymer has a melt flow index (230° C./2.16 kg) in the range of 40 to 80 g/10 min.

The thermoplastic composite described above may be formed into a tape.

According to a further aspect of the present invention, there is also provided a flexible pipe comprising at least one pipe layer formed or obtainable from a tape of a composite as described above.

The present invention also provides a flexible pipe comprising a pipe layer that comprises a first region formed from a thermoplastic composite comprising a polymer and carbon fibre, wherein carbon fibre is present in a first concentration, and a second region formed either from (i) a thermoplastic composite comprising a polymer and carbon fibre, wherein carbon fibre is present in a second concentration, or (ii) a polymer composition consisting essentially of polymer.

According to yet another aspect of the present invention, there is provided a method of making a thermoplastic composite as described herein, which comprises commingling polymer filaments and carbon fibre filaments to form an intimate mixture.

The commingled polymer filaments and carbon fibre filaments may be formed into a yarn. Several yarns may be arranged adjacent to one another to form an assembly of yarns, which is then compressed to form a tape. The tape may be wound around a pipe body to form a tubular pipe layer. The tubular pipe layer may then be heated so as to melt the polymer filaments around the carbon fibre filaments to form a fluoropolymer matrix. The resulting structure may be a flexible pipe layer, for example, a pressure armour layer.

The present inventors have found that, by commingling polymer filaments and carbon fibre filaments, an intimate mixture of polymer filaments and carbon fibre filaments can be produced. Furthermore, by selecting a polymer having a particular melt flow index, for example a fluoropolymer having a melt flow index (230° C./2.16 kg) in the range of 40 to 80 g/10 min, it is possible to achieve sufficient adhesion between the polymer and the carbon fibre. By improving both the dispersion of the carbon fibre throughout the polymer matrix and the adhesion between the carbon fibre and the polymer, the final mechanical properties of the resulting composite can be improved. The present invention, therefore, allows a thermoplastic composite to be produced that can be used to form a pressure armour layer that has sufficient mechanical strength to maintain and absorb the radial or axial forces on the flexible pipe. At the same time, the composite is relatively light, for example, when compared to metal wires conventionally used to form armour layers, and specifically pressure armour layers in the prior art.

As described above, the commingled filaments may be formed into a yarn. Several yarns may be arranged adjacent to one another to form an assembly of yarns, which is then compressed to form a tape. By arranging yarns having different carbon concentrations adjacent to one another, it is possible to produce a tape having regions having different carbon fibre concentrations. Such a tape may be wound round a pipe body to form a tubular layer and then heated to soften or melt the polymer around the carbon fibre filaments. This allows a flexible pipe layer having regions containing different concentrations of carbon fibre as an integral structure. The commingling technique, therefore, enables the mechanical properties of the pipe layer to be varied and controlled, through design, as desired. The design aspect is important as variations in the concentration of fibres in a composite may be inevitable using conventional techniques, however these variations in concentration are either or both un-intended or uncontrolled, and therefore cannot be relied upon for design purposes. A composite armour layer in accordance with the current invention is therefore also a significant improvement in the technology of composite pipe design.

Polymer

Any suitable polymer may be used to form the thermoplastic composite of the present invention. In one embodiment, the polymer is a fluoropolymer. Suitable fluoropolymers include perfluoroalkoxy alkanes (PFA), poly(ethene-co-tetrafluoroethene) (ETFE), polytetrafluoroethylene (PTFE), fluorinated ethylene propylene (FEP) and polyvinylidene fluoride (PVDF), or an alloy of at least two of these polymers. Preferably, the fluoropolymer is PVDF or an alloy comprising a PVDF. It will be recognised also by those skilled in the art that alternative polymers may also be used as directed in accordance with the present invention. For example, non-fluoropolymer materials such as poly-ether-ether-ketone (PEEK) or polyamide (for instance PA-11 or PA-12) may also be used as the matrix material of the composite layer, designed and manufactured with varying properties through and along the layer. In one embodiment, a combination of at least one fluoropolymer and at least one non-fluoropolymer may be used.

Preferably, the polymer is a fluoropolymer which comprises a homopolymer. Preferably the homopolymer is a grade of PVDF.

The fluoropolymer may have a melt flow rate (230° C./2.16 kg) in the range of 40 to 80 g/10 min, preferably, 50 to 75 g/10 min. In one embodiment, the fluoropolymer has a melt flow index of 60 to 70 g/10 min. Melt flow rate may be measured using ASTM D1238, ISO 1133.

The fluoropolymer or fluoropolymer alloy may have a density in the range 1.5-2.1 g/cm$^3$.

Other polymer types will of course have different melt flow rates and densities appropriate for those materials. For example PEEK may have a density of 1.1-1.5 g/cm$^3$. The density of the polyamides may be in the range 0.9-1.5 g/cm$^3$.

Carbon Fibre

The carbon fibre may have a tow size of 3000 to 12000.

Suitable carbon fibre filaments are sold under the trademark Toray T700 or Mitsubishi Grafil 34 or HexTow AS4 or Tenax HTS 40.

Thermoplastic Composite

The thermoplastic composite comprises commingled polymer filaments and carbon fibre filaments. Preferably, the polymer filaments may be fluoropolymer filaments. The polymer filaments may form 30 to 95 weight %, preferably 40 to 65 weight % of the total weight of the polymer filaments and carbon fibre filaments in the composite. In one embodiment, the polymer filaments form 45 to 60 weight %, preferably 50 to 55 weight % of the total weight of the polymer filaments and the carbon fibre filaments.

The commingled filaments may be formed by agitating the fibres at filament level with a compressed gas(es), for example, compressed air. This may result in the formation of a single end roving of intimately mixed or commingled fibres. Alternatively, the commingling may be performed using a series of combs arranged to mix the fibres.

Once commingled, the fibres may form a yarn. The yarn may be compressed or extruded (or pultruded) to form a tape of the thermoplastic composite. The tape may be wrapped around a pipe body to form a tubular layer. The tubular layer may then be heated to produce a flexible pipe layer, which may be used e.g. as a pressure armour layer in a flexible pipe.

In one embodiment, a flexible pipe layer is produced that has regions having different concentrations of carbon fibre. This may be useful if it is desirable to vary the mechanical properties of the pipe, for example, along its length or radius. For example, the pipe may have one or more regions in which carbon fibre is absent. Alternatively, the pipe may have one or more regions in which the carbon fibre concentration is higher than in other regions of the pipe.

In one embodiment, a tape is produced which has regions having different concentrations of carbon fibre. For example, such a tape may be produced by arranging a first region of yarns having a first concentration of carbon fibre adjacent to a second region of yarns having a second concentration of carbon fibre, and compressing or extruding or pultruding the yarns to form a tape, whereby the tape has a first region having a first concentration of carbon fibre, and a second region having a second concentration of carbon fibre. Such a tape may be wound around a pipe body to produce a tubular layer. When such a tubular layer is heated, the polymer may soften or melt to produce a flexible pipe layer.

In one embodiment, either the first region or second region of yarns may contain no carbon fibre. Accordingly, the resulting tape and the eventual flexible pipe layer may contain one or more regions that are devoid of carbon fibre.

In one embodiment the tape comprising fibre yarns may be wound around a pipe body when only partially consolidated, subsequently the layer is consolidated using heat and applied pressure as necessary once arranged on the pipe body.

In one embodiment the tape comprising fibre yarns may be wound around a pipe body before any consolidation is performed; all consolidation of the composite being applied, using heat and pressure as necessary, to the comingled fibres arranged on the pipe body.

The flexible pipe layer formed using the thermoplastic composite of the present invention may be positioned adjacent (e.g. in contact with) a tubular polymer layer. In one embodiment, the tubular polymer layer is present on the inside of the flexible pipe layer formed using the thermoplastic composite of the present invention. The tubular polymer layer may be an extruded thermoplastic barrier layer. The thermoplastic barrier layer may comprise, for example, a fluoropolymer or polyamide. An example of fluoropolymer for the thermoplastic barrier layer is polyvinylidene fluoride. An example of a suitable polyamide is Nylon® 11 (Arkema®). The thermoplastic barrier layer may be used as the pipe body around which a tape formed from the thermoplastic composite of the present invention is wound.

Additionally or alternatively, a tubular polymer layer may comprise multiple sub-layers of one or more polymer types or alloys, provided the outer sub-layer onto which the thermoplastic composite layer is applied is compatible with or the same as the thermoplastic polymer of the composite layer.

Additionally or alternatively, a tubular polymer layer may be of a material incompatible with the thermoplastic of the composite layer and require a tie-in layer between the two. That tie-in layer may comprise a different type of polymer, such as an epoxy material or may itself comprise a composite a matrix material with filler particles therein, as described in WO 2015/118356.

Additionally or alternatively, a tubular polymer layer may be positioned on the outside of the flexible pipe layer formed using the thermoplastic composite of the present invention. For example, the tubular polymer layer may be extruded onto the outside of the flexible pipe layer formed using the thermoplastic composite of the present invention as an anti-wear layer. The tubular polymer layer may be a thermoplastic layer. The layer may be formed of a polyamide, for example, Nylon® 11 (Arkema®).

A tensile strength layer may be wrapped around the anti-wear layer. Suitable tensile strength layers may be formed of metal wires or a composite, for example, a composite according to the present invention, or a composite comprising carbon fibres in a thermoset polymer matrix.

The thermoplastic composite may have an air bubble void content of less than 5% and preferably less than 2% by volume. This may be determined using standard density measurements and combining this with thermo-gravimetric analysis testing. An alternative method is to estimate the volume fraction of fibres using optical microscopy on a series of cross sections of the composites. ASTM D2734 is a further alternative method based on density measurement.

The thermoplastic composite may contain additives. Suitable additives include may include maleic anhydride which may be added to the polymer matrix at various stages in the manufacturing process for the polymer filaments. Alternatively additives such as those to improve UV resistance or abrasion resistance or friction characteristics of the material may be added, for example carbon black, nano-clays, titanium oxide etc. Such additives may be added to the thermoplastic composite prior to forming a tape, or prior to heating the tape to form a tubular layer. Alternatively, such additives may be incorporated into the polymer filaments and may be present in the polymer filaments prior to commingling the polymer filaments with the carbon fibre filaments.

Figure 2:
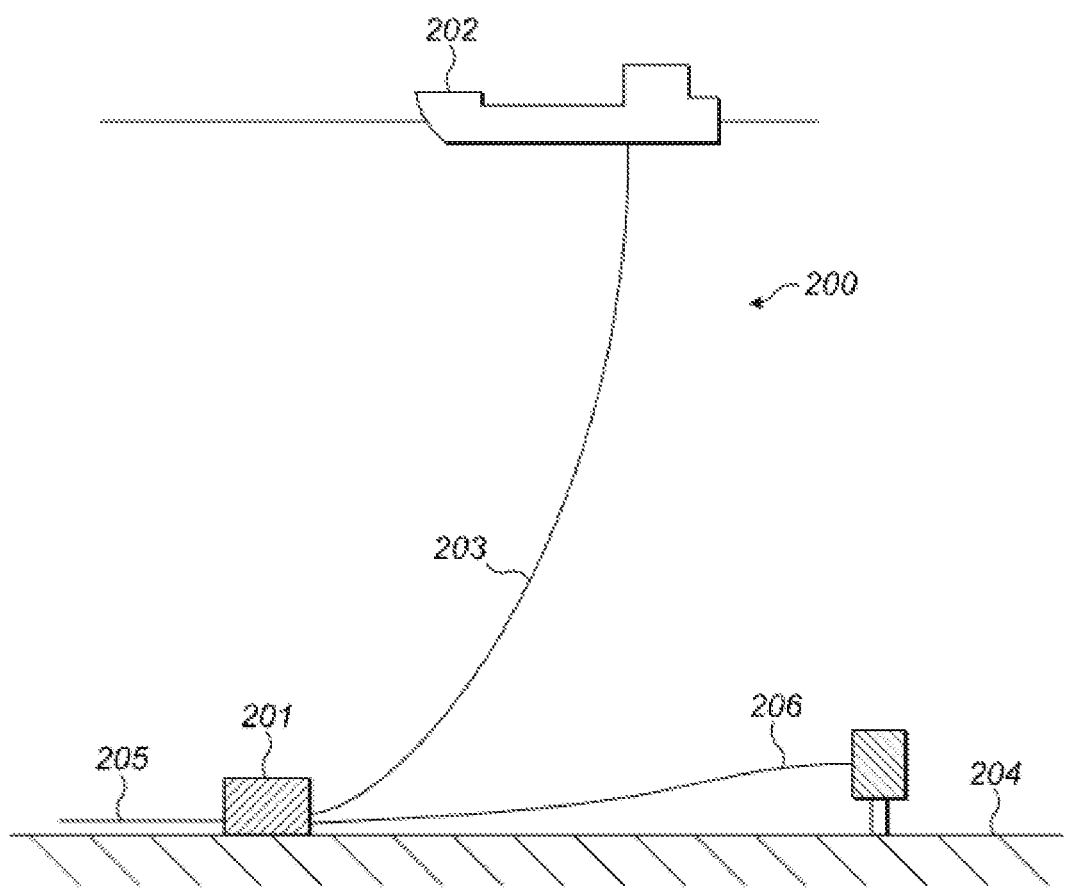

Embodiments of the invention are further described hereinafter with reference to the accompanying drawings, in which:

FIG. 1 illustrates a flexible pipe body; and
FIG. 2 illustrates a riser, flowline and jumper.

In the drawings like reference numerals refer to like parts.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments of the present invention are applicable to 'smooth bore' operations (i.e. without a carcass layer) as well as such 'rough bore' applications (with a carcass layer).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

A pressure armour layer 103 is a structural layer that increases the resistance of the flexible pipe to internal and external pressure and mechanical crushing loads. The layer also structurally supports the internal pressure sheath. In a preferred embodiment, the pressure armour layer 103 is formed from the thermoplastic composite described herein.

The flexible pipe body also includes an optional first tensile armour layer 105 and optional second tensile armour layer 106. Each tensile armour layer is used to sustain tensile loads and internal pressure. The tensile armour layer is often formed from a plurality of (e.g. metallic) wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers, or indeed as an outer surface of the flexible pipe in areas which may experience abrasion during service. The tape layer may be a polymer or composite or a combination of materials. The tape layer 104 may be formed of the thermoplastic composite described herein.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

FIG. 2 illustrates a riser assembly 200 suitable for transporting production fluid such as oil and/or gas and/or water from a sub-sea location 201 to a floating facility. For example, in FIG. 2 the sub-sea location 201 includes a sub-sea flow line. The flexible flow line 205 comprises a flexible pipe, wholly or in part, resting on the sea floor 204 or buried below the sea floor and used in a static application. The floating facility may be provided by a platform and/or buoy or, as illustrated in FIG. 2, a ship 200. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A thermoplastic composite comprising fluoropolymer filaments and carbon fibre filaments, wherein the fluoropolymer filaments and carbon fibre filaments are commingled to form an intimate mixture, and wherein the fluoropolymer has a melt flow index (230° C./2.16 kg) in the range of 50 to 80 g/10 min, wherein the carbon fibre filaments have a tow size of 3000 to 12000.

2. A composite according to claim 1, wherein the fluoropolymer has a melt flow index (230° C./2.16 kg) in the range of 60 to 70 g/10 min.

3. A composite according to claim 1, wherein the fluoropolymer is selected from at least one of perfluoroalkoxy alkanes (PFA), poly(ethene-co-tetrafluoroethene) (ETFE), polytetrafluoroethylene (PTFE), fluorinated ethylene propylene (FEP) and polyvinylidene fluoride (PVDF).

4. A composite according to claim 1, wherein the fluoropolymer is polyvinylidene fluoride (PVDF).

5. A composite according to claim 1, wherein the fluoropolymer is present in an amount of 30 to 70 weight % of the total weight of the fluoropolymer and carbon fibre.

6. A composite according to claim 1, which is in the form of a yarn.

7. A composite according to claim 6, wherein the composite is a tape formed from a plurality of yarns.

8. A composite according to claim 7, wherein the tape comprises a first region formed from a plurality of yarns having a first concentration of carbon fibre, and a second region formed from a plurality of yarns having a second concentration of carbon fibre, wherein the first and second concentrations are different.

9. A composite according to claim 7, wherein the tape comprises a region formed from a plurality of yarns, and a different region formed from a plurality of yarns consisting essentially of the fluoropolymer filaments.

10. A flexible pipe comprising at least one pipe layer formed from a tape of a composite according to claim 1.

11. A pipe as claimed in claim 10, wherein the at least one pipe layer formed from a tape of the composite is a pressure armour layer, which is positioned adjacent to a tubular polymer layer.

12. A pipe according to claim 11, wherein the tubular polymer layer is formed on the inside of the pressure armour layer as a fluid barrier layer.

13. A pipe according to claim 10, wherein the pipe layer is obtainable by wrapping the tape around a pipe body to form a pipe layer, and heating the tape so that the fluoropolymer filaments melt around the carbon filaments to form a fluoropolymer matrix.

14. A method of making a thermoplastic composite according to claim 1, wherein the method comprises commingling fluoropolymer filaments and carbon fibre filaments to form an intimate mixture.

15. A method according to claim 14, wherein the filaments are commingled using a compressed gas or a series of combs to form the intimate mixture of the filaments.

16. A method according to claim 14, wherein the method comprises forming yarns of the commingled filaments, and compressing or extruding the yarns to form a tape of the thermoplastic composite.

17. A method according to claim 16, wherein the method comprises:
arranging a first region of yarns having a first concentration of carbon fibre adjacent to a second region of yarns having a second concentration of carbon fibre, and
compressing or extruding the yarns to form a tape, whereby the tape has a first region having a first concentration of carbon fibre, and a second region having a second concentration of carbon fibre.

18. A method according to claim 16, wherein the method comprises arranging a first region of yarns that contain carbon fibre adjacent to a second region of yarns consisting essentially of fluoropolymer, and compressing or extruding the yarns to form a tape, whereby the tape has a first region containing carbon fibre, and a second region consisting essentially of fluoropolymer.

19. A method as claimed according to claim 16, wherein the method comprises wrapping the tape around a pipe body, and heating the wrapped tape so that the fluoropolymer filaments melt around the carbon filaments to form a fluoropolymer matrix.

20. A method according to claim 19, wherein the pipe body comprises an extruded tubular polymer layer.

\* \* \* \* \*